(12) United States Patent
Chen et al.

(10) Patent No.: US 10,164,671 B2
(45) Date of Patent: Dec. 25, 2018

(54) ECHO CANCELLATION CIRCUIT, RECEIVER APPLIED TO DIGITAL COMMUNICATION SYSTEM AND ECHO CANCELLATION METHOD

(71) Applicant: MStar Semiconductor, Inc., Hsinchu Hsien (TW)

(72) Inventors: Chia-Wei Chen, Hsinchu Hsien (TW); Kai-Wen Cheng, Hsinchu Hsien (TW); Ko-Yin Lai, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/368,885

(22) Filed: Dec. 5, 2016

(65) Prior Publication Data

US 2017/0353201 A1 Dec. 7, 2017

(30) Foreign Application Priority Data

Jun. 7, 2016 (TW) .............................. 105117921 A

(51) Int. Cl.
*H04B 1/00* (2006.01)
*H04B 1/10* (2006.01)
*H04B 1/16* (2006.01)

(52) U.S. Cl.
CPC ............ *H04B 1/1027* (2013.01); *H04B 1/16* (2013.01)

(58) Field of Classification Search
CPC ............... H04L 25/0204; H04L 25/022; H04L 27/2607; H04L 25/03019
See application file for complete search history.

(56) References Cited

U.S. PATENT DOCUMENTS

| 4,562,312 A | 12/1985 | Duttweiler | |
|---|---|---|---|
| 5,179,444 A * | 1/1993 | Koo | ........................ H04L 1/242 348/192 |
| 6,414,990 B1 * | 7/2002 | Jonsson | ................ H04L 7/0058 375/232 |

(Continued)

FOREIGN PATENT DOCUMENTS

| CN | 1138787 A | 12/1996 |
|---|---|---|
| CN | 1868137 A | 11/2006 |

*Primary Examiner* — Berhanu Tadese
(74) *Attorney, Agent, or Firm* — Edell, Shapiro & Finnan, LLC

(57) ABSTRACT

An echo cancellation circuit is provided to reduce or eliminate the effects of a pre-echo signal that is part of a received multi-path signal. The circuit includes: a delay module, receiving an input signal and delaying the input signal to generate a plurality of delayed signals; a multiplication module, multiplying the plurality of delayed signals by a plurality of coefficients to generate a plurality of multiplication results, respectively; a summing circuit, performing a summation on the plurality of multiplication results to generate a summation signal; a subtraction circuit, receiving a first delay signal and generating a subtracted signal according to the first delayed signal and the summation signal; and a coefficient calculating circuit, calculating the plurality of coefficients according to the subtracted signal. The echo cancellation circuit outputs an output signal as the subtracted signal, with the pre-echo signal diminished or eliminated.

15 Claims, 5 Drawing Sheets

(56) References Cited

U.S. PATENT DOCUMENTS

| | | | | |
|---|---|---|---|---|
| 6,970,511 B1* | 11/2005 | Barnette | ............ | H03H 17/0621 375/240.21 |
| 6,973,146 B1* | 12/2005 | Barnette | ................. | H04B 3/23 375/355 |
| 6,975,689 B1* | 12/2005 | McDonald | ........ | H04L 25/03159 348/726 |
| 6,983,047 B1* | 1/2006 | Chadha | .................... | H04B 3/23 370/289 |
| 8,121,185 B2* | 2/2012 | Cohen | ................ | H04L 25/0212 375/232 |
| 2002/0051087 A1* | 5/2002 | Limberg | ............... | H04L 1/0057 348/611 |
| 2003/0016734 A1* | 1/2003 | Blake | ...................... | H04L 1/205 375/219 |
| 2003/0072363 A1* | 4/2003 | McDonald | .......... | H04L 25/0212 375/232 |
| 2005/0123081 A1* | 6/2005 | Shirani | ................. | H04B 3/143 375/346 |
| 2005/0129223 A1* | 6/2005 | Piket | .................... | H04M 9/082 379/406.01 |
| 2005/0180558 A1* | 8/2005 | Zhang | .................. | H04M 9/082 379/406.1 |
| 2009/0135931 A1* | 5/2009 | Kawauchi | ........... | H04L 25/0204 375/260 |
| 2013/0336378 A1* | 12/2013 | Agrawal | ................. | H04L 27/01 375/233 |
| 2017/0353201 A1* | 12/2017 | Chen | ........................ | H04B 1/16 |

\* cited by examiner

ECHO CANCELLATION CIRCUIT, RECEIVER APPLIED TO DIGITAL COMMUNICATION SYSTEM AND ECHO CANCELLATION METHOD

This application claims the benefit of Taiwan application Serial No. 105117921, filed Jun. 7, 2016, the subject matter of which is incorporated herein by reference.

BACKGROUND OF THE INVENTION

Field of the Invention

The invention relates in general to an echo cancellation circuit, a receiver applied to a digital communication system and an echo cancellation method, and more particularly to an echo cancellation circuit, a receiver applied to a digital communication system and an echo cancellation method for cancelling pre-echo signals.

Description of the Related Art

Digital communication systems such as Digital Video Broadcasting (DVB) systems are extensively applied in the daily life. In simple, a digital communication system includes a transmitter and a receiver. A wireless signal is transmitted from the transmitter and arrives at the receiver through a channel. In practice, the channel of a digital communication system is usually a multipath channel, i.e., the wireless signal transmitted from the transmitter follows multiple paths to arrive at the receiver. In general, a signal that follows a main path to arrive at the receiver is referred to as a desired signal, and a signal that follows other paths to arrive at the receiver is referred to as an echo signal.

When a desired signal arrives at the receiver earlier than an echo signal, this echo signal is referred to as a post-echo signal, which may be eliminated using a whitening filter in the receiver. On the other hand, when an echo signal arrives at the receiver earlier than a desired signal (i.e., the desired signal arrives at the receiver only after the echo signal does), this echo signal is referred to as a pre-echo signal. The foregoing structure for eliminating the post-echo signal is incapable of successfully removing the pre-echo signal, such that a decoding circuit in the receiver cannot correctly decode the wireless transmitted from the transmitter.

Therefore, there is a need for an echo cancellation circuit and an echo cancellation method capable of eliminating the pre-echo signal.

SUMMARY OF THE INVENTION

It is a primary object of the present invention to provide an echo cancellation circuit, a receiver applied to a digital communication system and an echo cancellation method capable of cancelling a pre-echo signal to overcome issues of conventional solutions.

The present invention discloses an echo cancellation circuit applied to a receiver to cancel a pre-echo signal from a channel. The echo cancellation circuit includes: a delay module, receiving an input signal and delaying the input signal to generate a plurality of delayed signals; a multiplication module, coupled to the delay module, respectively multiplying the plurality of delayed signals to generate a plurality of multiplication results; a summation circuit, coupled to the multiplication module, performing a summation on the plurality of multiplication results to generate a summation signal; an subtraction circuit, coupled to the delay module, receiving a first delay signal among the plurality of delayed signals, and generating a subtracted signal according to the first delayed signal; and a coefficient calculating circuit, coupled to the subtraction circuit, calculating the plurality of coefficients according to the subtracted signal. Wherein, the echo cancellation circuit outputs an output signal as the subtracted signal.

The present invention further discloses a receiver applied to a digital communication system. The receiver includes a timing recovery circuit and an echo cancellation circuit. The echo cancellation circuit includes: a delay module, receiving an input signal and delaying the input signal to generate a plurality of delayed signals; a multiplication module, coupled to the delay module, respectively multiplying the plurality of delayed signals to generate a plurality of multiplication results; a summation circuit, coupled to the multiplication module, performing a summation on the plurality of multiplication results to generate a summation signal; an subtraction circuit, coupled to the delay module, receiving a first delay signal among the plurality of delayed signals, and generating a subtracted signal according to the first delayed signal; and a coefficient calculating circuit, coupled to the subtraction circuit, calculating the plurality of coefficients according to the subtracted signal. Wherein, the echo cancellation circuit outputs an output signal as the subtracted signal to the timing recovery circuit.

The present invention further discloses an echo cancellation method applied to a receiver to cancel a pre-echo signal from a channel. The echo cancellation method includes: receiving an input signal, and delaying the input signal to generate a plurality of delayed signals; respectively multiplying the plurality of delayed signals by a plurality of coefficients to generate a plurality of multiplication results; performing a summation on the plurality of multiplication results to generate a summation signal; subtracting the summation signal from a first delay signal among the plurality of delayed signals to generate a subtracted signal; and calculating the plurality of coefficients according to the subtracted signal such that the summation signal includes a signal component of the pre-echo signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
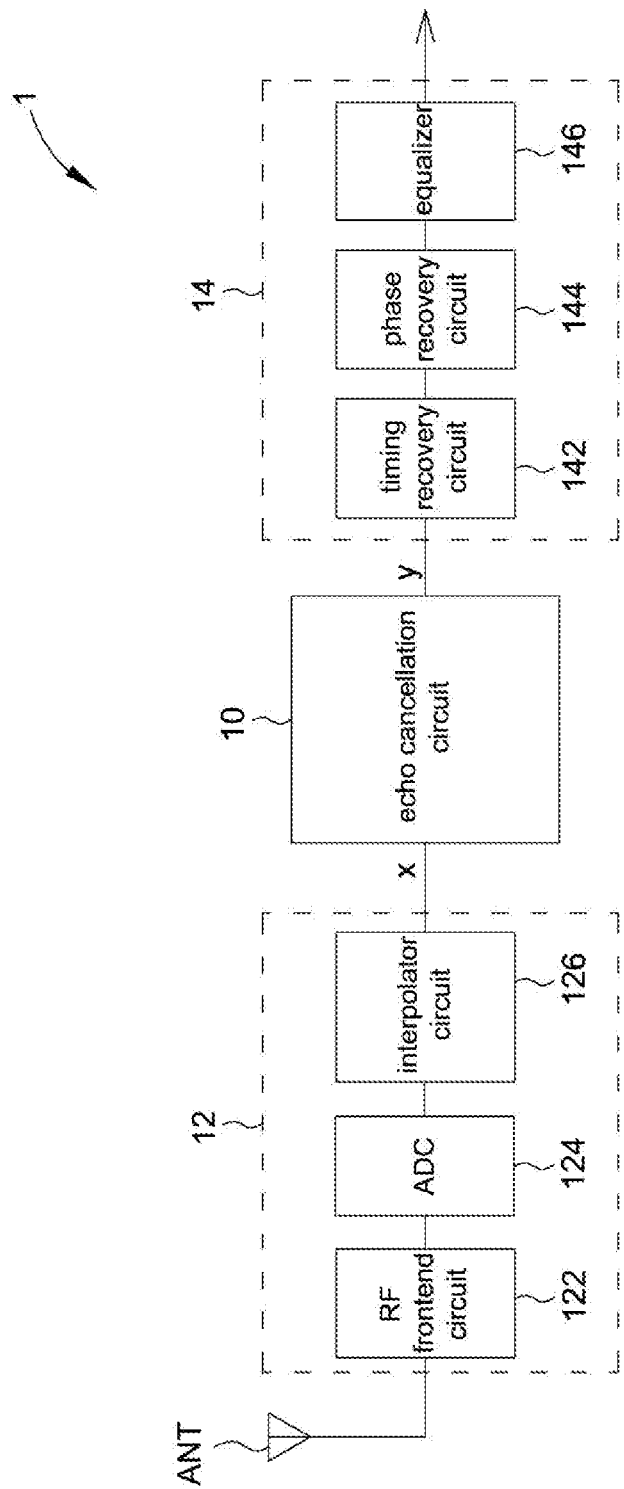
FIG. 1 is a block diagram of a receiver according to an embodiment of the present invention.

FIG. 1 shows a block diagram of a receiver 1 according to an embodiment of the present invention. The receiver 1 is applied to a digital communication system, which may be, for example but not limited to, a Digital Video Broadcasting (DVB) or Digital Terrestrial Multimedia Broadcast (DTMB)

system. The receiver 1 includes an antenna module Ant, an echo cancellation circuit 10, a frontend circuit 12 and a backend circuit 14. The frontend circuit 12 may include a radio-frequency (RF) frontend circuit 122, an analog-to-digital converter (ADC) 124 and an interpolator circuit 126. The backend circuit 14 may include a timing recovery circuit 142, a phase recovery circuit 144 and an equalizer 146. The frontend circuit 12 performs a frontend signal process on a signal that the antenna module Ant receives, and generates an input signal x to the echo cancellation circuit 10. The timing recovery circuit 142 determines a modulation scheme of the received signal according to an output signal y of the echo cancellation circuit 10, such that the phase recovery circuit 144 and the equalizer 146 may perform a data aided operation. The echo cancellation circuit 10 cancels an echo signal that is generated by a channel of the digital communication system. It should be noted that, before the echo cancellation circuit 10 is coupled to the timing recovery circuit 142, the echo cancellation circuit 10 performs its operation on the received signal without knowing the modulation scheme of the received signal. In other words, the echo cancellation circuit 10 cancels the echo signal through a non-data aided operation (i.e., a blind operation).

More specifically, when the channel of the digital communication system is a multipath channel, the signal transmitted by a transmitter of the digital communication system follows the multipath to arrive at the receiver 1, wherein a signal that follows a main path to arrive at the receiver 1 is referred to as a desired signal, whereas a signal that follows other paths to arrive at the receiver 1 is referred to as an echo signal. In other words, the input signal x may be represented as $x=s+a*s_{echo}+c+n$, where s represents a desired signal, $s_{echo}$ represents an echo signal caused by a channel of the digital communication system, a represents an echo intensity corresponding to the echo signal $s_{echo}$, c represents a co-channel interference (CCI), and n represents a white noise. When the echo signal $s_{echo}$ arrives at the receiver 1 earlier than the desired signal s, the echo signal $s_{echo}$ is a pre-echo signal $s_{pre}$ (i.e., $x=s+a*s_{pre}+c+w$), when the echo signal $s_{echo}$ arrives at the receiver 1 later than the desired signal s, the echo signal $s_{echo}$ is a post-echo signal $s_{post}$ (i.e., $x=s+a*s_{post}+c+w$). The echo cancellation circuit 10 may be used to cancel the pre-echo signal $s_{pre}$ or the post-echo signal $s_{post}$ in the input signal x.

Figure 2:
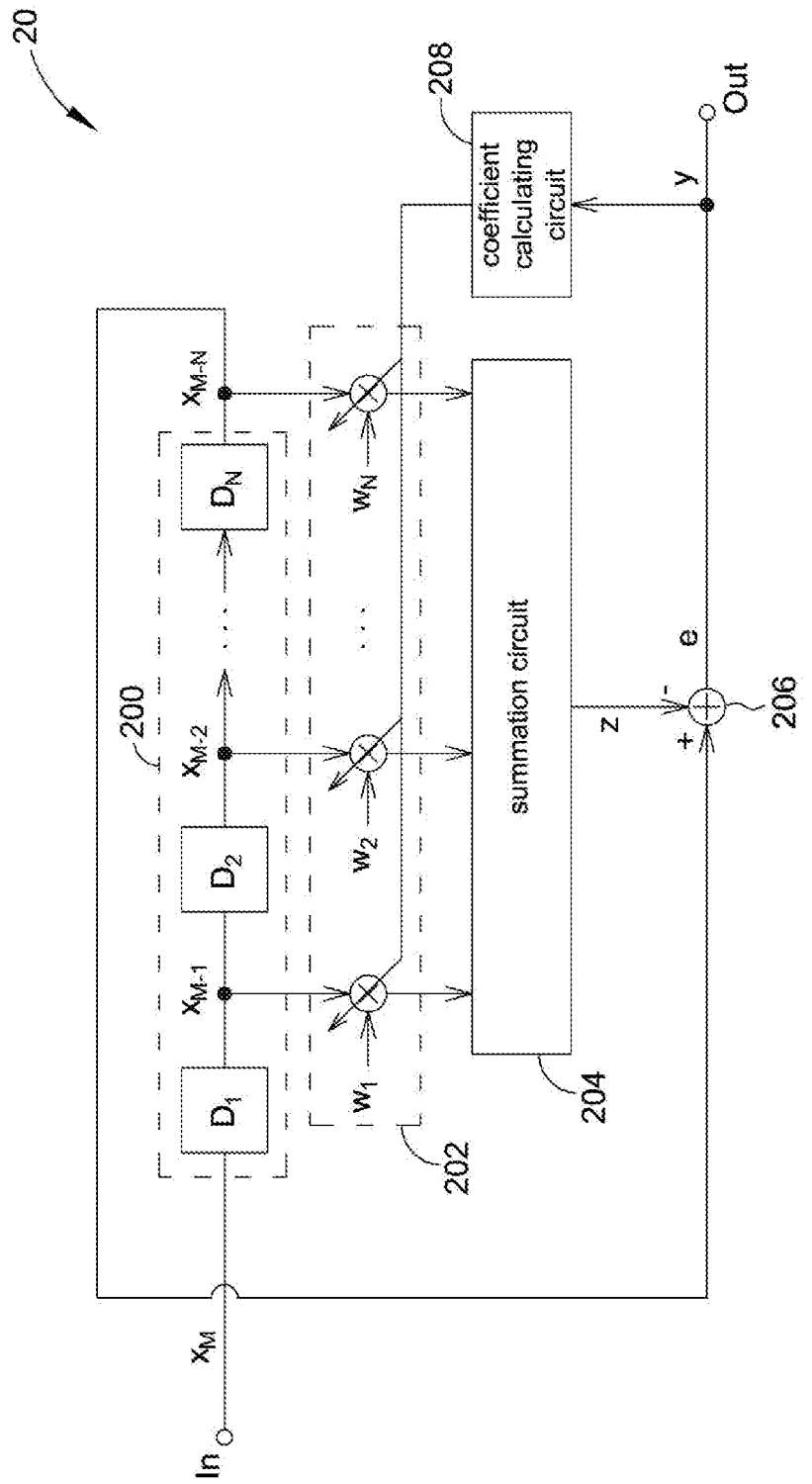
FIG. 2 is a block diagram of an echo cancellation circuit according to an embodiment of the present invention.

Referring to FIG. 2 showing a block diagram of an echo cancellation circuit 20 according to an embodiment of the present invention, implementation details of how an echo cancellation circuit cancels the pre-echo signal $s_{pre}$ in the input signal x are given below. As shown in FIG. 2, the echo cancellation circuit 20 includes an input end In, an output end Out, a delay module 200, a multiplication module 202, a summation circuit 204, a subtraction circuit 206 and a coefficient calculating circuit 208. The input end In may be coupled to the frontend circuit 12 to receive the input signal x. The output end Out may be coupled to the backend circuit 14 to transmit the output signal y of the echo cancellation circuit 20 to the backend circuit 14. More specifically, the input end In may be coupled to the interpolator circuit 126, and the output end Out may be coupled to the timing recovery circuit 142. The delay module 200 is coupled to the input end In to receive the input signal x and delay the input signal x to generate a plurality of delayed signals. To differentiate the input signal x of different time points, the input signal x received at an $M^{th}$ time point is denoted as an input signal $x_M$, and so the plurality of delayed signals are denoted as $x_{M-1}$ to $x_{M-N}$. The delay module 200 includes a plurality of buffers D1, which are connected in series to form a buffer series and respectively output the delayed signals $x_{M-1}$ to $x_{M-N}$. The buffer $D_1$ is the first buffer in the buffer series and is coupled to the input end In, and the buffer $D_N$ is the last buffer in the buffer series. The buffers D1 may be registers or, more specifically, shift registers. The multiplication module 202 includes a plurality of multipliers, which are respectively coupled to the plurality of buffers $D_1$ to $D_N$ and respectively multiply the delayed signals $x_{M-1}$ to $x_{M-N}$ outputted from the plurality of buffers $D_1$ to $D_N$ by a plurality of coefficients $w_1$ to $w_N$ to generate a plurality of multiplication results. The summation circuit 204, coupled to the plurality of multipliers, performs a summation on the plurality of multiplication results to generate a summation signal z, which may be represented as $$z = \sum_{k=1}^{N} x_{M-k} w_k.$$

The subtraction circuit 206, coupled to the last buffer $D_N$ in the buffer series, receives the delayed signal $x_{M-N}$ outputted from the buffer $D_N$, wherein the delayed signal $x_{M-N}$ is, among the delayed signals $x_{M-1}$ to $x_{M-N}$, the delayed signal that has the greatest delay interval. The subtraction circuit 206 is further coupled to the summation circuit 204 and the output end Out to subtract the summation signal z from the delayed signal $x_{M-N}$ to generate a subtracted signal e, and transmits the subtracted signal e to the output end Out; that is, the output signal y the echo cancellation circuit 20 outputs at its output end Out is the subtracted signal e. The coefficient calculating circuit 208, coupled to the subtraction circuit 206, calculates the coefficients $w_1$ to $w_N$ according to the output signal y (i.e., the subtracted signal e).

Further, the coefficient calculating circuit 208 may calculate the coefficients $w_1$ to $w_N$ according to the subtracted signal e by using a first algorithm, such that the summation signal z becomes a signal including a signal component of the pre-echo signal $s_{pre}$ (i.e., the summation signal z is approximately $a*s_{pre}$). The echo cancellation circuit 20 may then subtract the summation signal z that is approximately $a*s_{pre}$ from the delayed signal $x_{M-N}$ to cancel the pre-echo signal $s_{pre}$ and to further output the output signal y (i.e., the subtracted signal e) that does not include any pre-echo component. Wherein, the first algorithm may be a least mean square (LMS) algorithm. Details of the LMS algorithm are generally known to one person skilled in the art, and shall be omitted herein.

Figure 3:
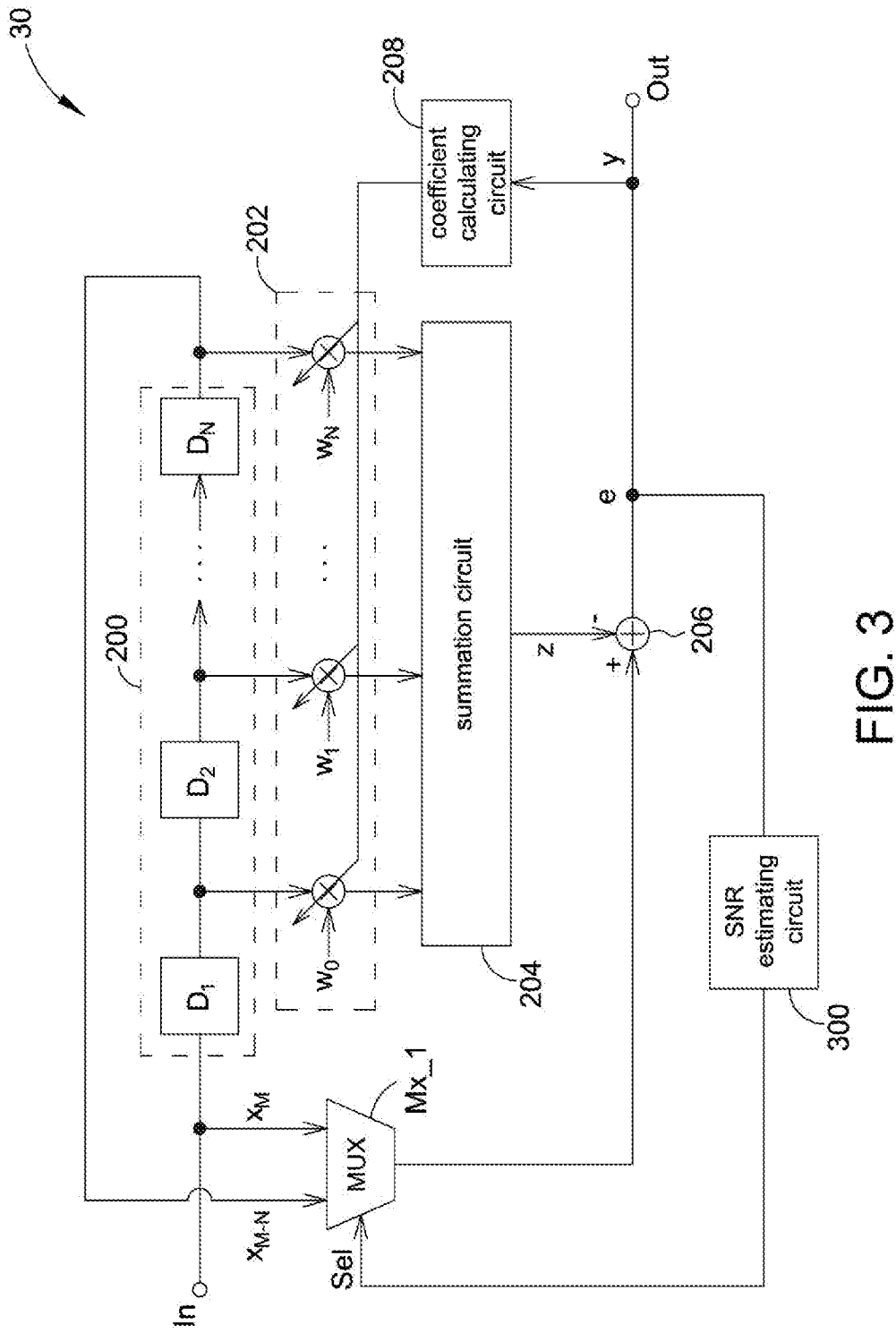
FIG. 3 is a block diagram of an echo cancellation circuit according to an embodiment of the present invention.

Further, the echo cancellation circuit may selectively cancel the pre-echo signal $s_{pre}$ or the post-echo signal $s_{post}$. FIG. 3 shows a block diagram of an echo cancellation circuit 30 according to an embodiment of the present invention. The echo cancellation circuit 30 is similar to the echo cancellation circuit 20, and so the same elements are represented by the same denotations. Different from the echo cancellation circuit 20, in addition to cancelling the pre-echo signal $s_{pre}$, the echo cancellation circuit 30 may also be applied to cancel the post-echo signal $s_{post}$. More specifically, the echo cancellation circuit 30 further includes a signal-to-noise ratio (SNR) estimating circuit 300 and a multiplexer MX_1. The multiplexer MX_1 has its first input end coupled to the last buffer $D_N$ in the buffer series to receive the delayed signal $x_{M-N}$, and its second input end coupled to the input end In of the echo cancellation circuit 30 and the first buffer $D_1$ in the buffer series to receive the input signal $x_M$. The multiplexer MX_1 further has its multiplexing output end coupled to the subtraction circuit 206; that is, the subtraction circuit 206 is coupled to the last buffer $D_N$ and the first buffer $D_1$ in the buffer series through the multiplexer MX_1. Further, the SNR estimating circuit 300 is coupled between the subtraction circuit 206 and the multiplexer MX_1, generates a selection signal Sel according to the subtracted signal e, and transmits the selection signal Sel to the multiplexer MX_1. The multiplexer MX_1 selectively transmits the input signal $x_M$ or the delayed signal $x_{M-N}$, to the subtraction circuit 206 according to the selection signal Sel.

When the multiplexer MX_1 transmits the delayed signal $x_{M-N}$ to the subtraction circuit 206 according to the selection signal Sel, operation principles of the echo cancellation circuit 30 are similar to those of the echo cancellation circuit 20, i.e., the echo cancellation circuit 30 may cancel the pre-echo signal $s_{pre}$. When the multiplexer MX_1 transmits the input signal x to the subtraction circuit 206 according to the selection signal, operation principles of the echo cancellation circuit 30 are similar to those of a whitening filter, i.e., the echo cancellation circuit 30 may cancel the post-echo signal $s_{post}$.

Further, the SNR estimating circuit 30 may generate the selection signal Sel according to a distribution of the subtracted signal e in a constellation diagram. For example, when the echo cancellation circuit 30 operates in a post-echo cancellation mode (i.e., the echo cancellation circuit 30 is performing an operation for cancelling the post-echo signal $s_{post}$, and the selection signal Sel is at a first potential to cause the input signal $x_M$ to be transmitted to the subtraction circuit 206), and the echo signal $s_{echo}$ in the input signal x is in fact the pre-echo signal $s_{pre}$, the distribution of the subtracted signal e in a constellation diagram is too dispersed. At this point, the SNR circuit 300 may change the selection signal Sel to a second potential to transmit the delay signal $x_{M-N}$ to the subtraction circuit 206. Thus, the echo cancellation circuit 30 may be switched from the post-echo cancellation mode to a pre-echo cancellation mode to cancel the pre-echo signal $s_{pre}$ in the input signal x, and vice versa. That is, when the echo cancellation circuit 30 operates in the pre-echo cancellation mode and the echo signal $s_{echo}$ in the input signal x is in fact the post-echo signal $s_{post}$, the distribution of the subtracted signal e in the constellation diagram is too dispersed. At this point, the SNR estimating circuit 300 may change the selection signal Sel to the first potential to transmit the input signal $x_M$ to the subtraction circuit 206, and the echo cancellation circuit 30 may then switch from the pre-echo cancellation mode to the post-echo cancellation mode to cancel the post-echo signal $s_{post}$ in the input signal x. Operation details of the SNR estimating circuit 300 determining whether the echo signal $s_{echo}$ is the pre-echo signal $s_{pre}$ or the post-echo signal according to the distribution of the subtracted signal e the constellation diagram are generally known to one person skilled in the art, and shall be omitted herein.

Figure 4:
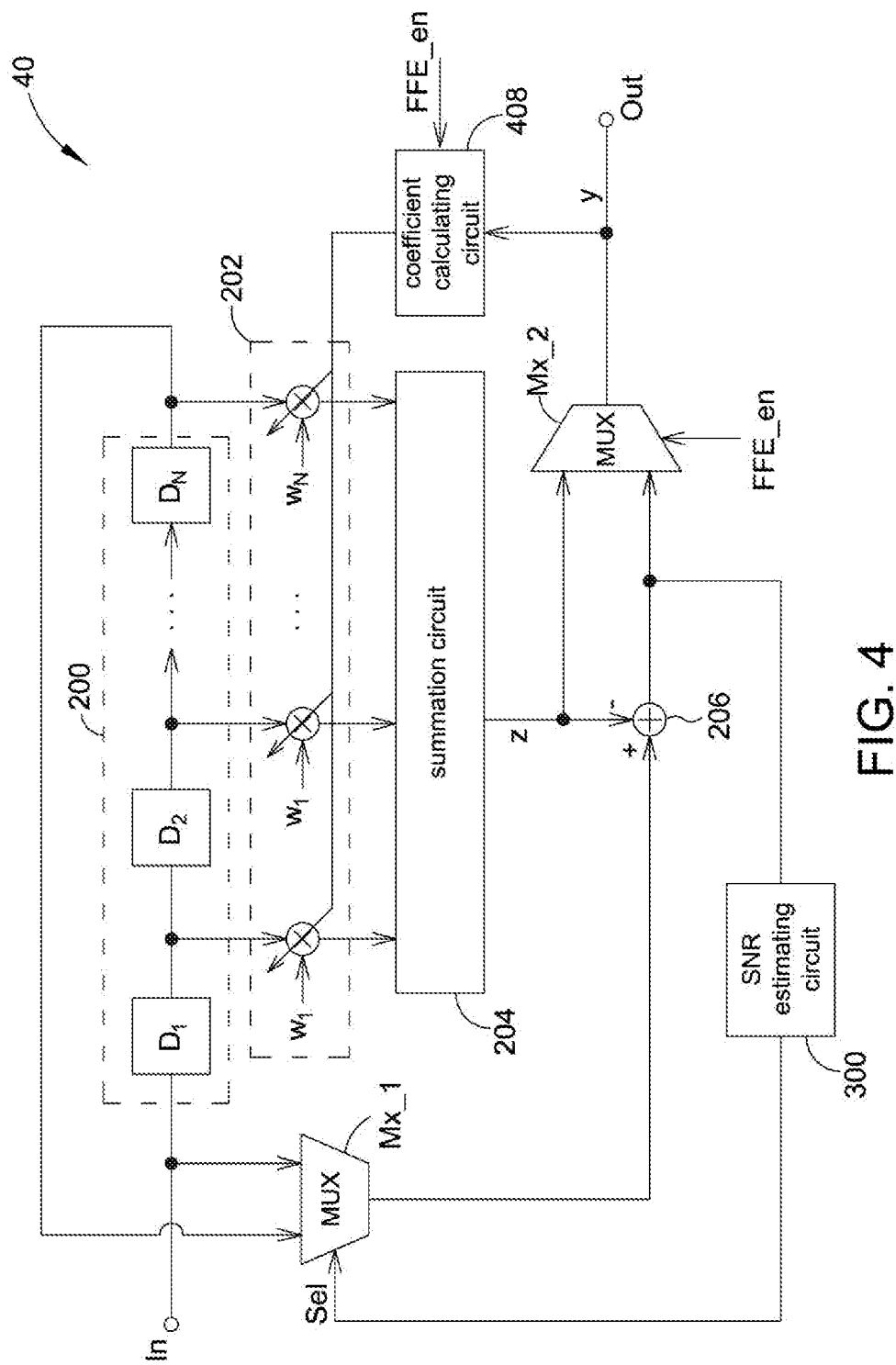
FIG. 4 is a block diagram of an echo cancellation circuit according to an embodiment of the present invention.

Further, when the desired signal s and the echo signal $s_{echo}$ in the input signal x arrive at the receiver 1 almost at the same time (i.e., a difference between a first time point at which the desired signal s arrives at the receiver 1 and a second time point at which the echo signal $s_{echo}$ arrives at the receiver 1 is smaller than a predetermined value), the echo cancellation circuit may selectively operate in a blind equalization mode. At this point, the echo cancellation circuit is regarded as a feed-forward equalizer (FFE) to process the input signal x. FIG. 4 shows a block diagram of an echo cancellation circuit 40 according to an embodiment of the present invention. The echo cancellation circuit 40 is similar to the echo cancellation circuit 30, and so the same elements are represented by the same denotations. Different from the echo cancellation circuit 30, the echo cancellation circuit 40 further includes a multiplexer MX_2, which is coupled between the subtraction circuit 206, the summation circuit 204 and a coefficient calculating circuit 408. More specifically, the multiplexer MX_2 has its first input end coupled to the subtraction circuit 206 to receive the subtracted signal e, its second input end coupled to the summation circuit 204 to receive the summation signal z, and its multiplexing output end coupled to the coefficient calculating circuit 408. In other words, the multiplexer MX_2 may selectively transmit the subtracted signal e or the summation signal z to the coefficient calculating circuit 408 according to an enable signal FFE_en that the receiver 1 generates. Further, the coefficient calculating circuit 408 further receives the enable signal FFE_en. More specifically, when the enable signal FFE_en the receiver 1 generates is in a third potential, the echo cancellation circuit 40 is an FFE. At this point, the multiplexer MX_2 transmits the summation signal z to the coefficient calculating circuit 408, the coefficient calculating circuit 408 calculates the coefficients $w_1$ to $w_N$ according to the summation signal z, and the echo cancellation circuit 40 outputs the output signal y as the summation signal z at its output end.

Further, when the enable signal FFE_en the coefficient calculating circuit 408 receives is at the third potential, the coefficient calculating circuit 408 may calculate the coefficients $w_1$ to $w_N$ using a second algorithm, which may be a constant modulus algorithm (CMA). Details of the CMA are generally known to one person skilled in the art, and shall be omitted herein.

It should be noted that, the foregoing non-limiting embodiments are for explaining the concept of the present invention, and modifications made be made thereto by one person skilled in the art. For example, instead of using the LMS algorithm and the CMA to calculate the coefficients $w_1$ to $w_N$, the coefficient calculating circuits 208 and 408 may also use other adaptive algorithms (e.g., a recursive least square (RLS) algorithm) to calculate the coefficients $w_1$ to $w_N$.

Further, for the echo cancellation circuits in FIG. 2 to FIG. 4 according to embodiments of the present invention, function blocks in FIG. 2 to FIG. 4 may be realized or implemented by digital circuits (e.g., RTL circuits) by one person skilled in the art.

Figure 5:
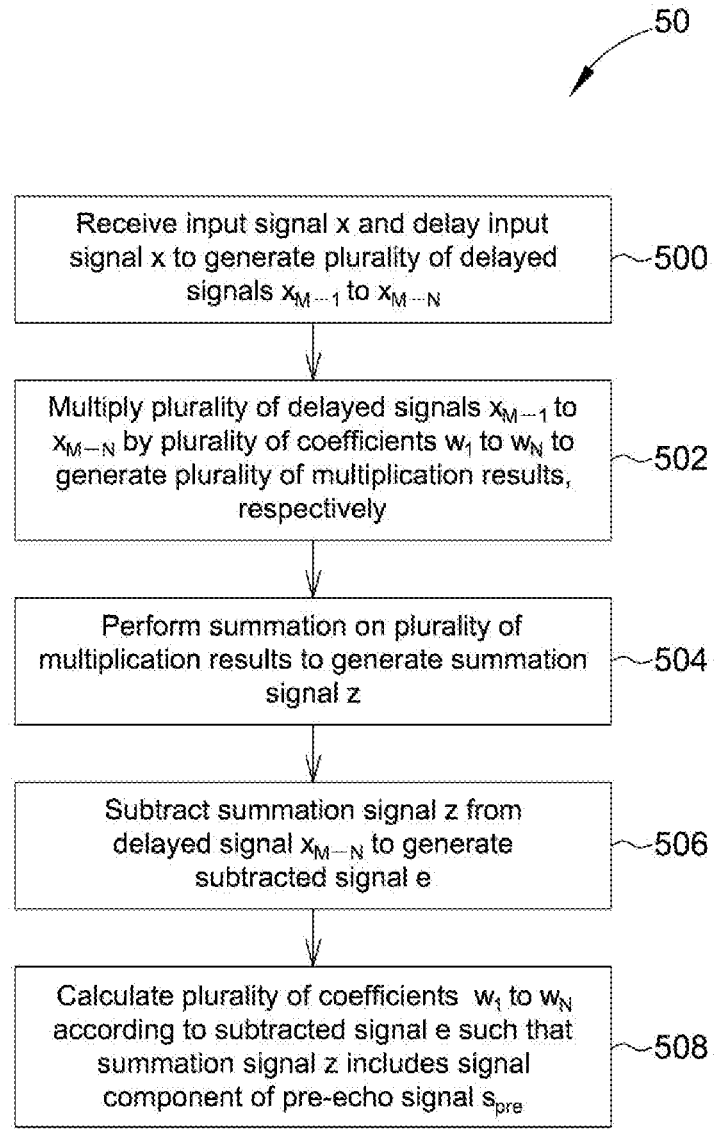
FIG. 5 is a flowchart of an echo cancellation process according to an embodiment of the present invention.

Further, the implementation of the echo cancellation circuit cancelling the pre-echo signal $s_{pre}$ in the input signal x may be concluded into an echo cancellation process 50. FIG. 5 shows a flowchart of the echo cancellation process 50 according to an embodiment of the present invention. The echo cancellation process 50 includes following steps.

In step 500, an input signal x is received, and the input signal x is delayed to generate a plurality of delayed signals $x_{M-1}$ to $x_{M-N}$.

In step 502, the plurality of delayed signals $x_{M-1}$ to $x_{M-N}$ are respectively multiplied by a plurality of coefficients $w_1$ to $w_N$ to generate a plurality of multiplication results.

In step 504, a summation is performed on the plurality of multiplication results to generate a summation signal z.

In step 506, the summation signal z is subtracted from the delayed signal $x_{M-N}$ to generate a subtracted signal e.

In step 508, the plurality of coefficients $w_1$ to $w_N$ are calculated according to the subtracted signal e, such that the summation signal z includes a signal component of the pre-echo signal $s_p$re.

Operation details of the echo cancellation process 50 may be referred to from the associated description described above, and shall be omitted herein.

In conclusion, the echo cancellation circuit of the present invention generates a subtracted signal according to delayed signals the delay module generates to further calculate coefficients of the echo cancellation circuit, thereby cancelling the pre-echo signal caused by the channel.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An echo cancellation circuit, applied to a receiver to cancel a pre-echo signal from a channel, comprising:
    a delay module, receiving an input signal, delaying the input signal to generate a plurality of delayed signals;
    a multiplication module, coupled to the delay module, multiplying the plurality of delayed signals by a plurality of coefficients to generate a plurality of multiplication results, respectively;
    a summation circuit, coupled to the multiplication module, performing a summation on the plurality of multiplication results to generate a summation signal;
    a subtraction circuit, coupled to the delay module and the summation circuit, receiving a first delayed signal among the plurality of delayed signals, generating a subtracted signal according to the first delayed signal and the summation signal; and
    a coefficient calculating circuit, coupled to the subtraction circuit, calculating the plurality of coefficients according to the subtracted signal;
    a first multiplexer, comprising:
        a first input end, coupled to the delay module, receiving the first delayed signal;
        a second input end, coupled to an input end of the echo cancellation circuit, receiving the input signal; and
        a multiplexing output end, coupled to the subtraction circuit;
    wherein, the first multiplexer transmits one of the first delayed signal and the input signal to the subtraction circuit according to a selection signal.

2. The echo cancellation circuit according to claim 1, wherein the delay module comprises a plurality of buffers respectively outputting the plurality of delayed signals.

3. The echo cancellation circuit according to claim 2, wherein the plurality of buffers are connected in series to form a buffer series, the subtraction circuit is coupled to a last buffer in the buffer series, and the last buffer outputs the first delayed signal.

4. The echo cancellation circuit according to claim 2, wherein the multiplication module comprises a plurality of multipliers respectively coupled to the plurality of buffers.

5. The echo cancellation circuit according to claim 1, further comprising:
    a signal-to-noise (SNR) estimating circuit, coupled to the subtraction circuit and the first multiplexer, generating the selection signal according to the subtracted signal.

6. The echo cancellation circuit according to claim 1, further comprising:
    a second multiplexer, comprising:
        a first input end, coupled to the subtraction circuit, receiving the subtracted signal;
        a second input end, coupled to the summation circuit, receiving the summation signal; and
        a multiplexing output end, coupled to the coefficient calculating circuit;
    wherein, the second multiplexer outputs one of the subtracted signal and the summation signal to the coefficient calculating circuit according to an enable signal.

7. The echo cancellation circuit according to claim 1, wherein an output signal of the echo cancellation circuit is transmitted to a timing recovery circuit.

8. A receiver, applied to a digital communication system, comprising:
    a timing recovery circuit; and
    an echo cancellation circuit, comprising:
        a delay module, receiving an input signal, delaying the input signal to generate a plurality of delayed signals;
        a multiplication module, coupled to the delay module, multiplying the plurality of delayed signals by a plurality of coefficients to generate a plurality of multiplication results, respectively;
        a summation circuit, coupled to the multiplication module, performing a summation on the plurality of multiplication results to generate a summation signal;
        a subtraction circuit, coupled to the delay module and the summation circuit, receiving a first delayed signal among the plurality of delayed signals, generating a subtracted signal according to the first delayed signal and the summation signal;
        a coefficient calculating circuit, coupled to the subtraction circuit, calculating the plurality of coefficients according to the subtracted signal;
        a first multiplexer, comprising:
            a first input end, coupled to the delay module, receiving the first delayed signal;
            a second input end, coupled to an input end of the echo cancellation circuit, receiving the input signal; and
            a multiplexing output end, coupled to the subtraction circuit;
        wherein, the first multiplexer transmits one of the first delayed signal and the input signal to the subtraction circuit according to a selection signal,
        wherein, the echo cancellation circuit outputs an output signal to the timing recovery circuit, and the output signal is the subtracted signal.

9. The receiver according to claim 8, wherein the delay module comprises a plurality of buffers respectively outputting the plurality of delayed signals.

10. The receiver according to claim 9, wherein the plurality of buffers are connected in series to form a buffer series, the subtraction circuit is coupled to a last buffer in the buffer series, and the last buffer outputs the first delayed signal.

11. The receiver according to claim 9, wherein the multiplication module comprises a plurality of multipliers respectively coupled to the plurality of buffers.

12. The receiver according to claim 8, wherein the echo cancellation circuit further comprises:
    a signal-to-noise (SNR) estimating circuit, coupled to the subtraction circuit and the first multiplexer, generating the selection signal according to the subtracted signal.

13. The receiver according to claim 8, wherein the echo cancellation circuit further comprises:
    a second multiplexer, comprising:

a first input end, coupled to the subtraction circuit, receiving the subtracted signal;

a second input end, coupled to the summation circuit, receiving the summation signal; and a multiplexing output end, coupled to the coefficient calculating circuit;

wherein, the second multiplexer outputs one of the subtracted signal and the summation signal to the coefficient calculating circuit according to an enable signal.

14. An echo cancellation method, applied to a receiver to cancel a pre-echo signal from a channel, comprising:

receiving an input signal, and delaying the input signal to generate a plurality of delayed signals;

multiplying the plurality of delayed signals by a plurality of coefficients to generate a plurality of multiplication results, respectively;

performing a summation on the plurality of multiplication results to generate a summation signal;

subtracting the summation signal from a first delayed signal among the plurality of delayed signals to generate a subtracted signal; and calculating the plurality of coefficients according to the subtracted signal, such that the summation signal comprises a signal component of the pre-echo signal;

receiving the first delayed signal at a first input end of a first multiplexer coupled to the delay module;

receiving the input signal at a second input end of the first multiplexer, coupled to an input end of the echo cancellation circuit;

generating at the first multiplexer a selection signal; and transmitting one of the first delayed signal and the input signal to the subtracting step circuit according to the selection signal.

15. The echo cancellation method according to claim 14, wherein the first delayed signal is, among the plurality of delayed signals, a signal that has a greatest delay interval.

* * * * *